July 20, 1954 W. ROEPKE 2,684,211

DRIVE SYSTEM FOR SOUND TAPES

Filed Jan. 16, 1952

Inventor:
Willi Röpke

Patented July 20, 1954 2,684,211

UNITED STATES PATENT OFFICE 2,684,211

DRIVE SYSTEM FOR SOUND TAPES

Willi Roepke, Berlin-Steglitz, Germany

Application January 16, 1952, Serial No. 266,732

5 Claims. (Cl. 242—76)

The present invention relates to a novel system for driving magnetic sound recording devices or other devices in which a tape or wire serves particularly as carrier of different recordings. In the known devices, especially in magnetic sound recording devices, it is commonly necessary to drive the tape alternately in one of two opposite directions, e. g. if magnetic tapes with several sound tracks are used which are recorded alternately in opposite directions. The sound record tapes of such devices are suitably wound up and off between two reels. These reels are arranged, according to our own former proposals, in a preferably oval container which is designed so that the sound carrier tape arranged between the two reels will be automatically, without any special manipulatons, placed on the corresponding guiding devices and the tape driving pulley as soon as the container is placed on the device containing the magnet heads, the tape driving pulley etc. In this connection it will be necessary to bring the magnetic tape in contact either with one or with the other side of the magnetic heads provided in the device; this is accomplished by a corresponding motion of the means for tape guiding which is effected as soon as the direction of tape travel shall be changed.

The driving system corresponding to the present invention solves the task to switch, automatically and immediately after the changing of the direction of travel of the magnetic tape or the like, the means for guiding the tape consisting particularly of pulleys, discs, pins, or the like into another position by which the tape is pressed to the other side of the magnetic head or heads. For this purpose the main driving shaft, e. g. the motor shaft of the device, is arranged symmetrically to the reel shafts which are to be driven by it; these three shafts are arranged about on the circumference of a circle the center of which represents the pivotal point of a pivoting coupling segment which comes into tangential gear with the motor shaft or with the gear shafts. This coupling segment carries the tape guiding means which are to be switched or it is coupled with a special movable carrier for these tape guiding means. Hereat, this coupling segment is arranged so that, after the motor shaft has just been switched over to the other sense of rotation, the segment is at first pivoted a little by one of the reel shafts with which it is loosely connected (friction coupling); hereby, a special coupling part of this segment is brought into tight gear with the main driving shaft or motor shaft itself which drives the segment rapidly into the other position; shortly before this swivelling movement has been finished, this tight coupling contact between motor shaft and segment is again disengaged.

Figure 1:
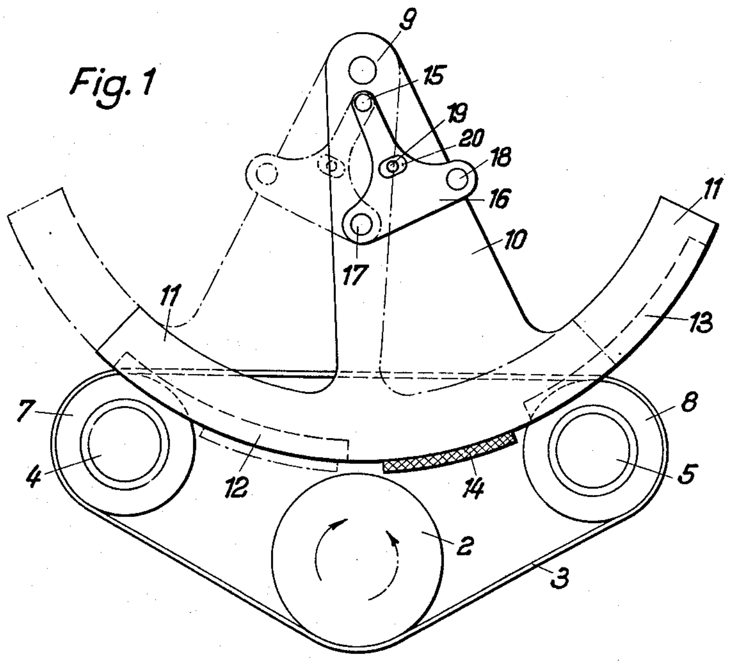
Figure 2:
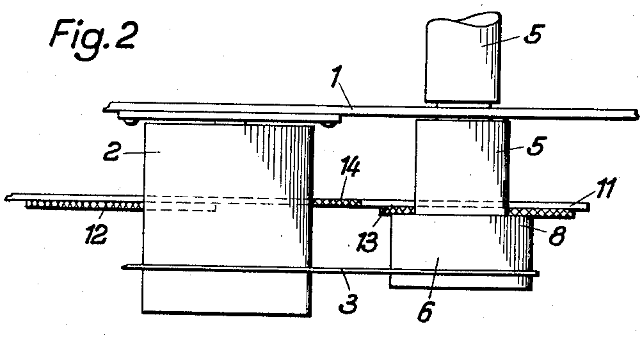

The principle of this invention and its most important details can be recognized from the drawng which represents, by way of example, an embodiment of the invention in which all those members have been omitted which are not necessary for the understanding of this invention. Fig. 1 shows a top view of those members of the driving system which constitute the object of the invention; the top cover plate of the device which partitions off the driving members from outside and upon which the reel container is placed has been omitted for clarity's sake. Fig. 2 shows a side view of the members represented in Fig. 1 as well as the position of the top cover plate.

At the underside of the cover plate 1 the driving motor 2 is fixed which is designed preferably as an external armature motor so that its outside surface represents the driving shaft. This driving shaft is connected, by means of an elastic cord 3, with the two shafts 4 and 5 which are in connection with the members (not shown in the drawing) for carrying the tape reels. The motor or its shaft 2 and the two reel shafts 4 and 5 are mounted in such a way that the shaft 2 is arranged symmetrically between the two other shafts and, together with these, approximately on the circumference of a sector corresponding to the segmental coupling member 11. This member 11 is provided with a piece 10 by which it can be pivoted around point 9, the outside rim of segment 11 forming a circle around this point 9. Segment 11 is provided at its underside near the outside rim with two coupling linings 12 and 13, one of which is in contact with the collar 7, the other with collar 8. These collars are arranged at the lower part of each of the two reel driving shafts 4 and 5, collar 8 being shown in Fig. 2 as the upper surface of the lower shoulder 6 of shaft 5. By these plane collar surfaces 7 and 8, which sometimes can also be provided with friction linings, segment 11 is supported in a position of relatively loose coupling engagement. At the middle portion of segment 11, suitably directly at its outside surface, a further friction lining 14 is provided which, as shown particularly in Fig. 1, in each of its two possible terminal swivelling positions is somewhat before its engagement with the motor shaft 2. If this lining 14 has been swivelled around into frictional contact with the motor shaft 2, the resulting coupling engagement is very tight as compared with that between the linings 12 and 13 and the collar surfaces 7 and 8.

The manner of action of this arrangement is as follows: At that position of the coupling segment 11 which is drawn in full lines (to the right) the motor shaft 2 rotates, according to the directional arrow likewise drawn in full, in clockwise direction, whereat the coupling surfaces 7 and 8 of the shafts 4 and 5 act in the same direction on the corresponding frictional linings 12 and 13. If, however, the sense of rotation of shaft 2 is reversed—as shown by the dash-dotted arrow—the shafts 4 and 5 are likewise rotated in the opposite direction, thus moving the segment 11 at first a small distance to the left; immediately after this motion has begun, the friction lining 14 comes into tight coupling contact with shaft 2, thus at once swivelling the segment 11 together with its carrier member 10 around into its left position shown by dash-dotted lines whereat the frictional lining 14 comes once more out of contact with shaft 2 shortly before this pivoting movement has been finished. The loose coupling contact which then remains between the brake lining 12 and collar surface 7, or between lining 13 and surface 8, is quite sufficient for keeping the segment in this new position.

The segment 11 itself or its carrier member 10 can be employed as a carrier for the tape guiding means which are to be swivelled around; more advantageous, however, is another arrangement represented in Fig. 1 which consists of the following members:

Apart from the center point 9 another pivot center 15 is provided which is somewhat displaced in the direction towards the segment rim and around which a T-shaped member 16 can be swivelled carrying two pins, pulleys, or the like 17 and 18. The latter project through the top cover plate 1 and through the bottom plate of the reel container (not shown in the drawing) and serve for the guiding of the magnetic sound tape. Now, the swivel motion of the segment 10, 11 results in a corresponding movement of the carrier member 16: the pin 19 provided at the member 10 projects into the hole 20 of the carrier 16 and moves it at the swivelling movement into the dash-dotted position. Correspondingly the position of the tape guiding means 17 and 18 is changed in such a way that the magnetic tape guided by them is moved, in their first position, past one side of the magnet heads, in their second position, however, past the other side of the heads. The hole 20 of the carrier 16 is advantageously designed wider in the swivelling direction than pin 19; thus, the swivel motion of carrier 16 caused by that of member 10 does not take place immediately after the reversal of the rotation of shaft 2 but only after the tight coupling contact between the frictional lining 14 and the shaft 2 has been accomplished. In this way, the coupling contact between the linings 12 and 13 and the frictional surfaces 7 and 8 can be kept very loose because only the relatively easily movable members 10, 11 have to be moved as long as only this coupling is in action. Member 16, however, which is not so easily movable, as it has to move the magnetic sound tape and its guiding means, is swivelled around directly after the tight coupling contact between shaft 2 and lining 14 has been accomplished. Therefore, the wear of the frictional surfaces 12 and 13 caused by their operation remains very small.

The shown embodiment of the present invention can be modified in different ways within the scope of the principal idea of it. For instance, according to the desired gear ratio, larger driving discs or wheels can be provided at the reel shafts 4 and 5 around which the drive cord 3 is wound. Furthermore, the frictional linings 12 and 13 can be designed shorter than shown in the drawing so that at each moment only one lining is in contact with the corresponding frictional surface 7 and 8.

I claim:

1. A drive system for sound record tapes movable in two directions, comprising in combination a driving shaft coupled with two driven shafts arranged parallel to said driving shaft, an axis carrying a swivelling segmental member, the outer peripheric ends of which lie loosely on collars of said driven shafts and the central part of said periphery being provided with a friction lining adapted to engage with the outer surface of said driving shaft in such a manner as to be swivelled into one of two positions after the beginning of a new direction of rotation, and a member carrying tape guiding pulleys and swivel-mounted on an axis arranged near said axis of said segmental member, said segmental member being provided with a pin projecting into a hole of said member in such a manner as to move said member into one of two positions needed for the two moving directions of the tape.

2. A drive system for sound record tapes movable in two directions, comprising in combination a driving shaft coupled with two driven shafts, arranged parallel to said driving shaft, an axis carrying a swivelling segmental member, the outer peripheric ends of which lie loosely on collars of said driven shafts and the central part of said periphery being provided with a friction lining adapted to engage with the outer surface of said driving shaft in such a manner as to be swivelled into one of two positions after the beginning of a new direction of rotation, whereat this swivelling motion is started by the collars of the driven shafts, and a member carrying tape guiding pulleys and swivel-mounted on an axis arranged near said axis of said segmental member, said segmental member being provided with a pin projecting into a hole of said member in such a manner as to move said member into one of two positions needed for the two moving directions of the tape.

3. A drive system for sound record tapes movable in two directions, comprising in combination a driving shaft coupled with two driven shafts arranged parallel to said driving shaft, an axis carrying a swivelling segmental member, the outer peripheric ends of which are provided at its underside with frictional linings 12 and 13 and lie loosely on collars of said driven shafts and the central part of said periphery being provided with a friction lining adapted to engage with the outer surface of said driving shaft in such a manner as to be swivelled into one of two positions after the beginning of a new direction of rotation, and a member carrying tape guiding pulleys and arranged swivel-mounted on an axis near said axis of said segmental member, said segmental member being provided with a pin projecting into a hole of said member in such a manner as to move said member into one of two positions needed for the two moving directions of the tape.

4. A drive system for sound record tapes movable in two directions, comprising in combination a driving shaft coupled with two driven shafts arranged parallel to said driving shaft, an axis carrying a swivelling segmental member, the outer peripheric ends of which lie loosely on collars of said driven shafts and the central part of said periphery being provided with a friction lining adapted to engage with the outer surface of said driving shaft in such a manner as to be swivelled into one of two positions after the beginning of a new direction of rotation, and a member carrying tape guiding pulleys and swivel-mounted on an axis arranged near said axis of said segmental member, said segmental member being provided with a pin projecting into a hole of said member in such a manner as to move said member into one of two positions needed for the two moving directions of the tape, said driving shaft being connected with said driven shafts by an elastic cord.

5. A drive system for sound record tapes movable in two directions, comprising in combination a driving shaft coupled with two driven shafts arranged parallel to said driving shaft, an axis carrying a swivelling segmental member, the outer peripheric ends of which lie loosely on collars of said driven shafts and the central part of said periphery being provided with a friction lining adapted to engage with the outer surface of said driving shaft in such a manner as to be swivelled into one of two positions after the beginning of a new direction of rotation, and a member carrying tape guiding pulleys and swivel-mounted on an axis arranged near said axis of said segmental member, said segmental member being provided with a pin projecting into a hole of said member in such a manner as to move said member into one of two positions needed for the two moving directions of the tape, said driving shaft being the outer surface of the driving motor.

References Cited in the file of this patent

UNITED STATES PATENTS

| Number | Name | Date |
|---|---|---|
| 1,291,868 | Hawthorne | Jan. 21, 1919 |
| 2,194,879 | Von Mihaly et al. | Mar. 26, 1940 |
| 2,449,234 | Knoble | Sept. 14, 1948 |
| 2,524,064 | Masterson | Oct. 3, 1950 |

FOREIGN PATENTS

| Number | Country | Date |
|---|---|---|
| 7,624 | Great Britain | Apr. 11, 1899 |